United States Patent
Lineberger

(10) Patent No.: US 8,419,531 B2
(45) Date of Patent: Apr. 16, 2013

(54) METHODS, SYSTEMS, AND COMPUTER PROGRAM PRODUCTS FOR DETERMINING AN INTEGRITY MEASURE OF A GAME USER USING DYNAMICALLY GENERATED DATA EVENTS

(75) Inventor: William B. Lineberger, Cary, NC (US)

(73) Assignee: MFV.com, Inc., Cary, NC (US)

( * ) Notice: Subject to any disclaimer, the term of this patent is extended or adjusted under 35 U.S.C. 154(b) by 990 days.

(21) Appl. No.: 11/906,209

(22) Filed: Oct. 1, 2007

(65) Prior Publication Data

US 2008/0176659 A1 Jul. 24, 2008

Related U.S. Application Data

(60) Provisional application No. 60/881,944, filed on Jan. 23, 2007.

(51) Int. Cl.
| | |
|---|---|
| A63F 9/24 | (2006.01) |
| A63F 13/00 | (2006.01) |
| G06F 17/00 | (2006.01) |
| G06F 19/00 | (2011.01) |

(52) U.S. Cl.
USPC .......................................... 463/29; 715/764

(58) Field of Classification Search .............. 463/29, 463/35
See application file for complete search history.

(56) References Cited

U.S. PATENT DOCUMENTS

| | | | |
|---|---|---|---|
| 6,582,309 B2 * | 6/2003 | Higurashi et al. .............. 463/31 |
| 7,001,276 B2 | 2/2006 | Shinoda | |
| 2002/0128736 A1 * | 9/2002 | Yoshida et al. ................. 700/92 |
| 2002/0169014 A1 | 11/2002 | Egozy et al. | |
| 2003/0153374 A1 * | 8/2003 | Gilmore ............................ 463/6 |
| 2004/0078572 A1 | 4/2004 | Pearson et al. | |
| 2006/0247038 A1 * | 11/2006 | Bamberger et al. ............. 463/29 |
| 2007/0192849 A1 * | 8/2007 | Golle et al. ..................... 726/16 |

FOREIGN PATENT DOCUMENTS

WO   WO 2008/091642   7/2008

OTHER PUBLICATIONS

Preventing Bots from Playing Online Games by P. Golle and N. Ducheneaut, ACM Computers in Entertainment, vol. 3, No. 3, Jul. 2005.*
Notification of Transmittal of the International Search Report and the Written Opinion of the International Searching Authority, or the Declaration for International Application No. PCT/US08/00888 (Jul. 2, 2008).

* cited by examiner

*Primary Examiner* — Melba Bumgarner
*Assistant Examiner* — Syvila Weatherford
(74) *Attorney, Agent, or Firm* — Jenkins, Wilson, Taylor & Hunt, P.A.

(57) ABSTRACT

The subject matter described herein includes methods, systems, and computer program products for determining an integrity measure of a game user using dynamic performance events. According to one aspect, the method includes providing a plurality of predetermined data events in a gaming interface for sending to a client device and inserting, during sending of the gaming interface to the client device, at least one dynamically generated data event into the predetermined data events for determining an integrity measure of a game user. After sending gaming interface to a client device, input response to the at least one dynamically generated data event is received. Based on the input response to the at least one dynamically generated data event, a game user integrity measure is determined.

15 Claims, 5 Drawing Sheets

METHODS, SYSTEMS, AND COMPUTER PROGRAM PRODUCTS FOR DETERMINING AN INTEGRITY MEASURE OF A GAME USER USING DYNAMICALLY GENERATED DATA EVENTS

RELATED APPLICATIONS

This application claims the benefit of U.S. provisional patent application No. 60/881,944, filed Jan. 23, 2007, the disclosure of which is incorporated herein by reference in its entirety.

TECHNICAL FIELD

The subject matter described herein relates to determining an integrity measure of a user. More particularly, the subject matter described herein relates to methods, systems, and computer program products for determining an integrity measure of a game user using dynamic performance events in an online skills-based video game.

BACKGROUND

Online skills-based video games are designed to test how well a game user performs a series of maneuvers and generate a score based on how accurately the user performs those maneuvers. A higher score typically represents a more accurate performance of the required maneuvers. For example, in a skills-based musical game in which a series of notes are displayed on a screen, a game user may be required to play a series of notes as they are displayed on a screen. A performance that perfectly executes the notes displayed on the screen would generate a perfect score. Any improperly played notes or unplayed notes would generate a lower score.

Conventional skills-based games allow a game user to practice his or her performance as many times as he or she wishes. The required series of maneuvers that must be performed by the game user during each practice performance are identical to those maneuvers required during a tournament performance. Continuing the example above, in a musical skills-based game, a user practicing his performance of the song "Hey Jude" would play the same sequence of notes in the same manner, no matter when the performance occurred. In other words, the song "Hey Jude" consists of a predetermined sequence of notes that does not change each time it is played.

In addition to providing a single game user a way to practice his or her skills, skills-based games may also provide multiple game users a means for comparing their skills with each other. For example, skills-based games may be the basis for online tournaments in which game users each simultaneously attempt to perform the same series of maneuvers. The user who most accurately performs the maneuvers generates the highest score and wins.

One problem associated with conventional online skills-based games is that software or mechanical devices may be used to perfectly perform a predetermined series of maneuvers required by the game without any human intervention. For example, a software program, such as a script, may be configured to perfectly execute the same predetermined series of maneuvers required by the game. This script may be embedded into the game client device and executed at the time of the game performance. The result of a client device operated by a software program is a perfect game performance, every time, without requiring any human skill on the part of the game user. Because a game server hosting an online tournament simply receives a series of inputs from each competing game client device, it is unable to distinguish a human user that perfectly performs the required maneuvers from a software script that also perfectly performs the required maneuvers. As the popularity of online skills-based tournaments increases, the monetary or other rewards received by winners of these games also increases, as well as the incentive to cheat. Therefore, it is increasingly desirable to distinguish between human and non-human participants in online skills-based games.

Accordingly, in light of the above described difficulties and needs, there exists a need for improved methods, systems, and computer program products for determining an integrity measure of a game user using dynamic performance events.

SUMMARY

The subject matter described herein includes methods, systems, and computer program products for determining an integrity measure of a game user using dynamic performance events. According to one aspect, the method includes providing a plurality of predetermined data events in a gaming interface for sending to a client device and inserting, during sending of the gaming interface to the client device, at least one dynamically generated data event into the predetermined data events for determining an integrity measure of a game user. After sending gaming interface to a client device, an input response to the at least one dynamically generated data event is received. Based on the input response to the at least one dynamically generated data event, a game user integrity measure is determined.

According to another aspect, a system is described for determining an integrity measure of a game user using dynamic performance events. The system includes a game server module for providing a plurality of predetermined data events in a gaming interface for sending to a client device to a client device, and a game user integrity measure module for generating and inserting at least one dynamically generated data event into the predetermined data events, for receiving an input response to the at least one dynamically generated data event, and for determining a game user integrity response measure based on the received input response to the at least one dynamically generated data event.

BRIEF DESCRIPTION OF THE DRAWINGS

Embodiments of the subject matter described herein will now be explained with reference to the accompanying drawings of which.

DETAILED DESCRIPTION

The subject matter described herein includes methods, systems, and computer program products for determining an integrity measure of a game user using dynamically generated data events. According to one aspect, a system according to the subject matter described herein may be implemented as hardware, software, and/or firmware components executing on one or more components of a system or device configured to determining an integrity measure of a game user using dynamically generated data events.

The subject matter described herein may be implemented using a computer-readable medium containing a computer program, executable by a machine, such as a computer. Exemplary computer readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple devices or computing platforms.

As used herein, a "computer-readable medium" can be any means that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, device, or propagation medium. For example, the computer readable medium may be a memory storing an instance of a program containing instructions for performing the steps recited herein for determining a data integrity measure of a game user.

More specific examples (a non-exhaustive list) of the computer-readable medium can include the following: a wired network connection and associated transmission medium, such as an Ethernet transmission system, a wireless network connection and associated transmission medium, such as an IEEE 802.11(a), (b), or (g) or a Bluetooth™ transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disk (CD), a portable digital versatile disk (DVD), and the like.

Figure 1:
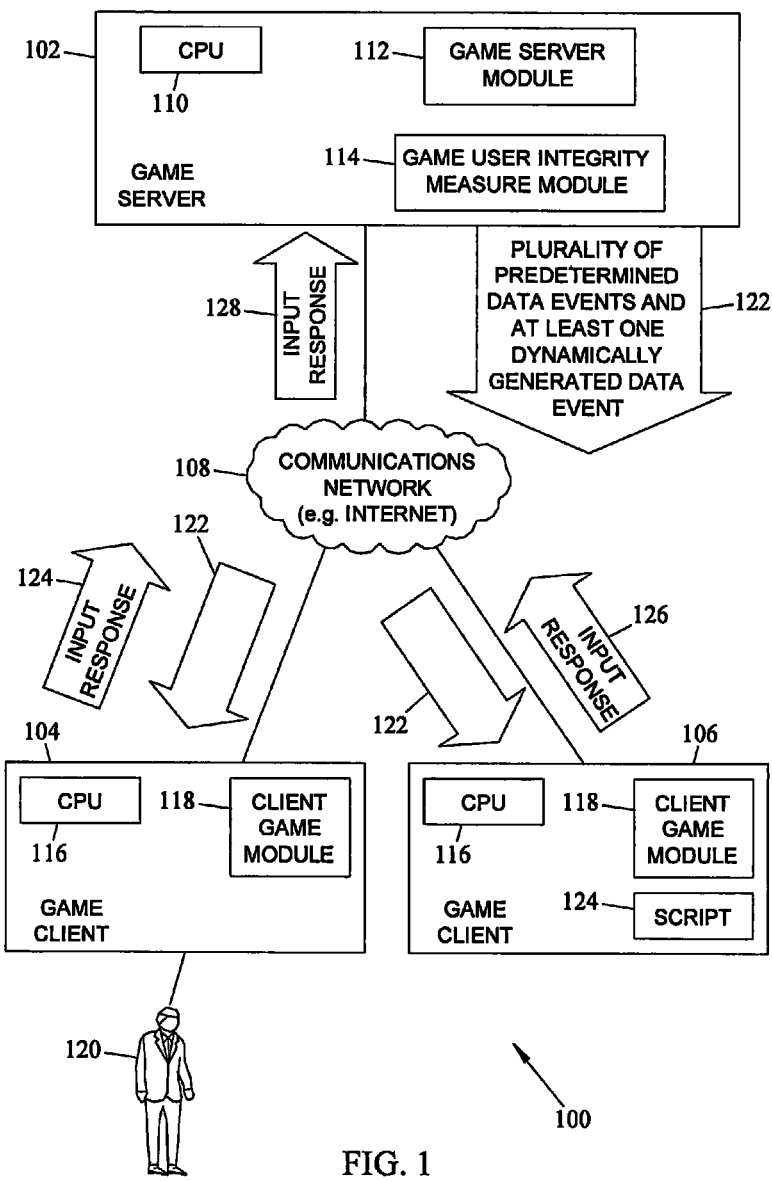
FIG. 1 is a block diagram of an exemplary online skills-based tournament system using a game user integrity measure module according to an embodiment of the subject matter described herein.

FIG. 1 is a block diagram of an exemplary online skills-based tournament system including a game user integrity measure module 100 according to an embodiment of the subject matter described herein. Referring to FIG. 1, system 100 includes game server 102 which communicates with clients 104 and 106 via communications network 108. Server 102 includes central processing unit (CPU) 110 for executing game server module 112 and game user integrity measure module 114. Game server module 112 may be software for implementing any online skills-based tournament or individual game. For example, game server module 112 may include software, such as Guitar Hero™, available from Red Octane, Inc. of Sunnyvale, Calif., for implementing an online music tournament. As will be described in more detail below, integrity measure module 114 may insert dynamically generated data events in online games and measure game user integrity based on responses to the dynamically generated data events.

Clients 104 and 106 each include CPU 116 and client game module 118. It is appreciated that game server module 112 and client game module 118 may include any combination of hardware and software for providing the game environment specified by a game. This may include, but is in no way limited to, joysticks, keyboards, hard drives, and digital versatile disc (DVD) drives.

In the embodiment illustrated in FIG. 1, client 104 is operated by user 120 and client 106 is operated by software script 124. Script 124 is capable of executing a predetermined series of inputs flawlessly, but is not configured to receive visual or audio game interface streams from server 102. Therefore, user 120 is capable of responding to visual and audio inputs streamed from server 102, while script 124 is not.

During the performance of an online skills-based game tournament between game clients 104 and 106, a game interface is streamed to each client device 104 and 106 from game server 102 via communications network 108. The streamed game interface may be displayed on a screen display (not shown) connected to game clients 104 and 106. A CPU 116 located on each game client 104 and 106 executes client game module 118, which is configured to interpret various input responses from the game user. For example, game server 102 may display a screen on the display devices connected to each game client 104 and 106 indicating for the game user to press a specified button on a keypad input device. The game user may then see the screen display provided and provide the appropriate input response. These input responses are sent to game server 102 and interpreted by game server module 112 and game user integrity measure module 114.

Based on these received input responses, game, user integrity measure module 114 may generate a user integrity measure, such as a numerical score, such that non-human game users such as script 124 are identified and disqualified. The process of generating a game user integrity measure may be customized for each game and will be discussed in greater detail below.

Figure 2:
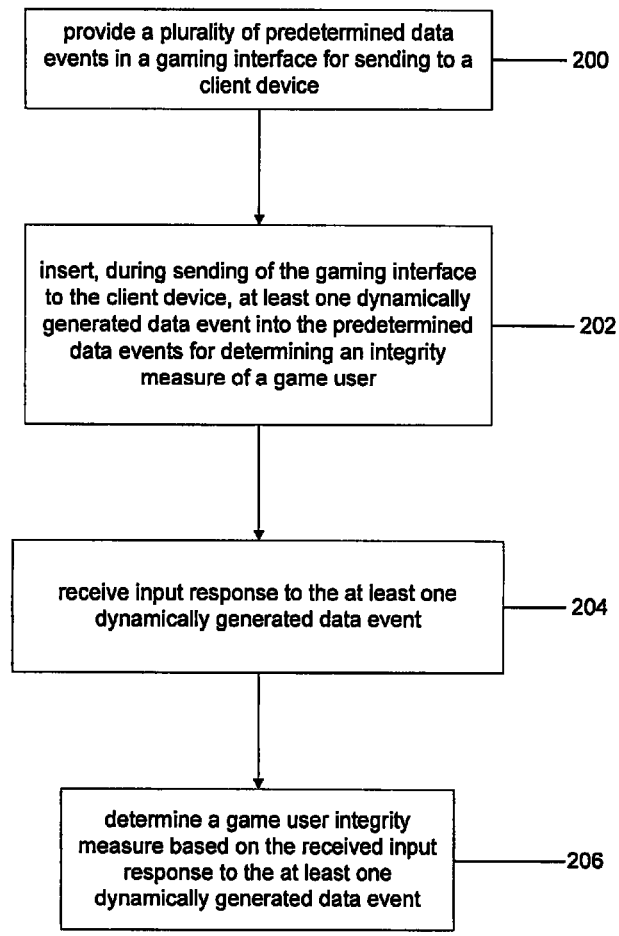
FIG. 2 is a flow chart of an exemplary process for operating an online skills-based tournament including a game user integrity measure module according to an embodiment of the subject matter described herein.

FIG. 2 is a flow chart of an exemplary process for determining an integrity measure of a game user using dynamically generated data events according to an embodiment of the subject matter described herein. The process of FIG. 2 may be performed in this example with reference to system 100 of FIG. 1. Referring to FIG. 2, in block 200, a plurality of predetermined data events are provided in a gaming interface for streaming to a client device. For example, game server module 112 may generate a screen display of a race track including obstacles. A game user may use one or more input devices connected to a client game device in order to maneuver a vehicle around the track. Each time game server module 112 is executed, the same plurality of data events are provided to the game user.

In block 202, during streaming of the gaming interface to the client device, at least one dynamically generated data event is inserted into the predetermined series of data events for determining an integrity measure of a game user. For example, game user integrity measure module 114 may insert one or more dynamically generated data events into the stream of predetermined data events generated by game server module 112. Dynamically generated data events may include additional obstacles in a racing game, or a modified score in a musical game. The term "dynamically generated data events" is used herein to described the events inserted by game user integrity measure module 114 instead of "randomly generated data events" because limits may be placed on the data events generated and inserted by game user integrity measure module 114. For example, in a musical game, any modification to the predetermined musical score must be capable of being performed by a human user using the game interface and the input device for the game, whether the input device is a keyboard or a guitar-like input device.

In block 204, input response to the at least one dynamically generated data event is received from the client device. For example, user 120 may successfully perform all required maneuvers in a game including both rehearsed and dynamically generated maneuvers. Alternatively, script 124 will only perform the set of predetermined maneuvers and fail to perform any dynamically generated maneuvers.

In block 206, a game user integrity measure is determined based on the received input to the at least one dynamically generated data event. For example, game user integrity measure module 114 may receive input response 128 from game clients 104 and 106 associated with each game client's performance of the required maneuvers, including both predetermined and dynamically generated data events, that are streamed to game clients 104 and 106. Game user integrity measure module 114 may assign a different value to an improper performance or failure to perform a dynamically generated data event than to predetermined data events. This value, such as a game score, may be determined such that the penalty associated with failure to properly perform a dynamically generated maneuver is sufficient to differentiate human game user 120 from software script 124. For example, the dynamically generated maneuver may be designed to be so easily performed by human game user 120 that even the most unskilled game player will successfully perform it. However, this maneuver may nevertheless be unperformable by script 124. For example, game user integrity measure module 114 may display a dynamic data event requesting that the game user press the button "A" on the displays connected to game clients 104 and 106. Human game user 120 would then press button "A" as instructed on the display. However, script 124 cannot "see" the display, and therefore would fail to press button "A". The difference, therefore, in the input response generated by game client 104 and 106 would be used by game user integrity measure module 114 to differentiate user 120 from script 124.

Figure 3:
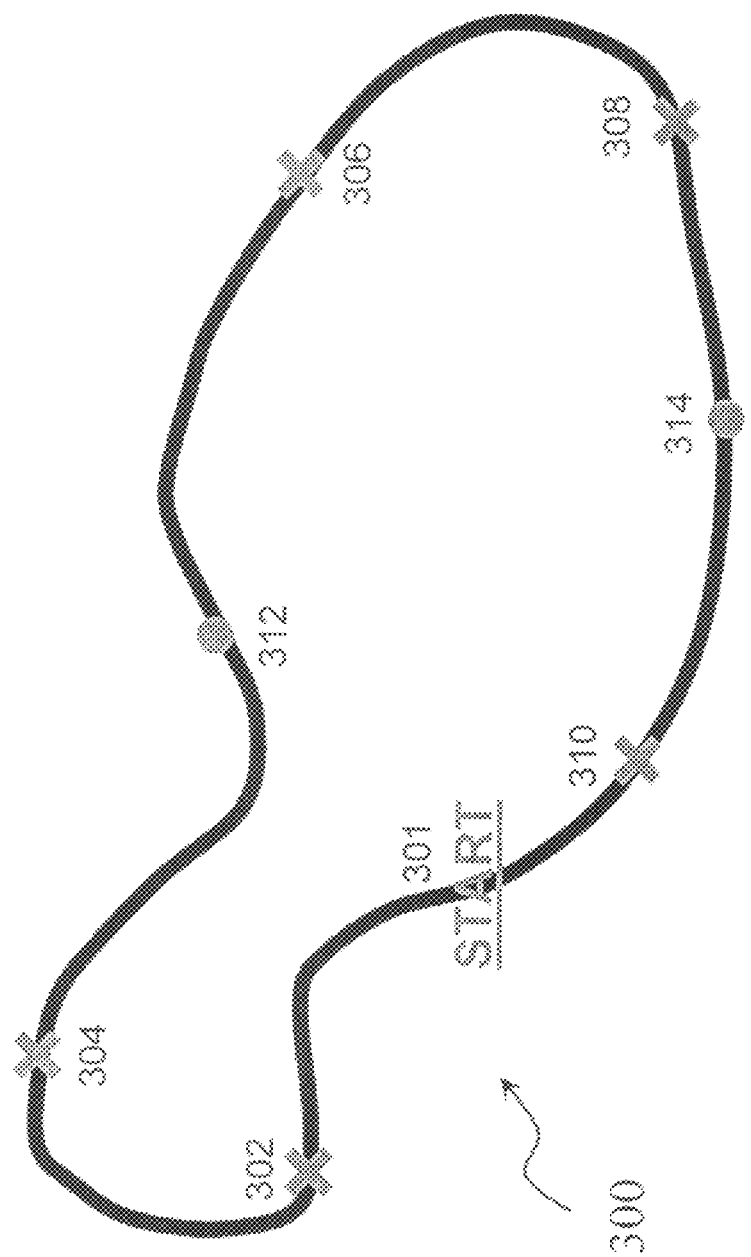
FIG. 3 is a diagram of an exemplary racing-based game environment for operating an online skills-based tournament including a game user integrity measure module according to an embodiment of the subject matter described herein.

FIG. 3 is a diagram of an exemplary racing-based game environment for operating an online skills-based tournament including a game user integrity measure module according to an embodiment of the subject matter described herein. In FIG. 3, game clients 104 and 106, operated by user 120 and script 124 respectively, begin the game at start 301. Clients 104 and 106 must negotiate track 300 where the user with the highest score after one lap wins. Users begin the game at start 301 and proceed clockwise. Obstacles 302-310 are predetermined and generated by game server module 112. In addition to obstacles 302-310, dynamically generated obstacles 312 and 314 are generated at the time of performance.

Script 124 successfully negotiates predetermined obstacles 302 and 304 because the program was written to avoid these obstacles. However, upon arriving at obstacle 312, script 124 does not "see" or "hear" the streamed data related to the obstacle because script 124 is not configured to receive visual or audio input from server 102. Thus, script 124 fails to negotiate obstacle 312. This is repeated for obstacles 306-310 and 314. Upon completing track 300, script 124's final score is -50 because it received -50 points for each of the two dynamically generated dynamically generated obstacles.

User 120 also successfully negotiates obstacles 302 and 304, which he has seen before by practicing. Upon arriving at obstacle 312, user 120 sees and/or hears information related to the dynamically generated data event and successfully negotiates it. User 120 thus completes a circuit around track 300, successfully negotiating seven obstacles, five of which were predetermined and two of which were dynamically generated at the time of performance. Therefore, player 1's total score is 70, because he received 10 points for each obstacle and no penalties. Accordingly, user 120 is identified as a skilled winner and script 124 is identified as a non-human "cheater" in the online skills-based game 300.

Figure 4A:
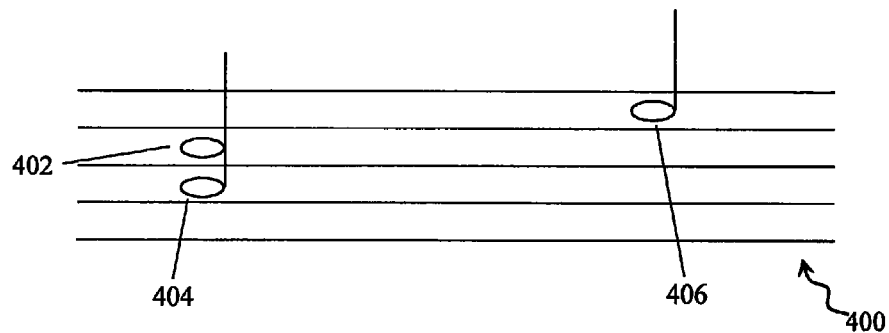
FIGS. 4A-4C are diagrams of exemplary music-based game environments for operating an online skills-based tournament including a game user integrity measure module according to an embodiment of the subject matter described herein.

In another embodiment, the online skills-based game includes a musical game that requires a gamer user to play a series of musical notes. FIG. 4A is an example of exemplary music-based game environments for operating an online skills-based tournament including a game user integrity measure module according to an embodiment of the subject matter described herein. Referring to FIG. 4A, song 400 includes three notes 402, 404 and 406. Any number of notes 402-406 included in song 400 constituting a contiguous sequence may be displayed in the order in which they are to be played by the game user. For example, a first screen display may be provided to user 120 that includes notes 402 and 404. After a predetermined period of time has elapsed, a second screen display may be provided to user 120 that includes note 406. Therefore, game user 120 may only see a fraction of the entire song to be performed at any given time.

Figure 4B:
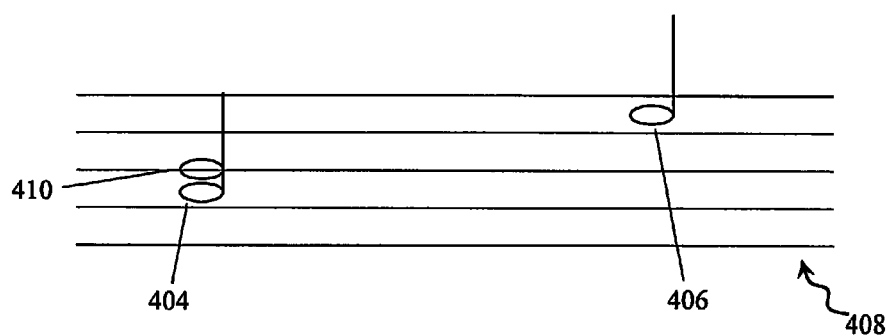

FIG. 4B is an exemplary song including one or more predetermined notes from song 400 as well as at least one dynamically generated note 410 for determining an integrity measure of a game user. In FIG. 4B, predetermined note 402 is removed and replaced by dynamically generated note 410. In effect, note 402 is lowered from a "c" to a "b" in treble clef.

In an online skills-based musical tournament between client 104 operated by game user 120 and client device 106 operated by script 124, game server 102 will display a game interface including notes 404 and 410 instead of 404 and 402. While both game user 120 and script 124 are equally capable of performing notes 404 and 402, only game user 120 is capable of dynamically altering his performance in order to play dynamically generated notes 404 and 410. Script 124, on the other hand, simply plays notes 404 and 402 as it has been pre-programmed to do.

Upon completion of the performance of all required notes indicated in FIG. 4B, a numerical score may be generated by game user integrity measure module 114. This score may include a game user integrity measure for distinguishing between human game user 120 and software script 124. For example, +10 points may be received for every correctly played note, whether predetermined or dynamically generated at the time of performance. However, -50 points may be received for each incorrectly played dynamically generated note, whereas only -10 points may also be received for each incorrectly played predetermined note. Therefore, by providing a higher penalty associated with failure to correctly perform the one or more dynamic performance events inserted into a series of predetermined data events by game server 102, a game user integrity measure, such as a numerical score, may be generated to distinguish human game users from software or mechanical game playing devices incapable of dynamically adjusting to additional performance requirements at the time of performance.

Figure 4C:
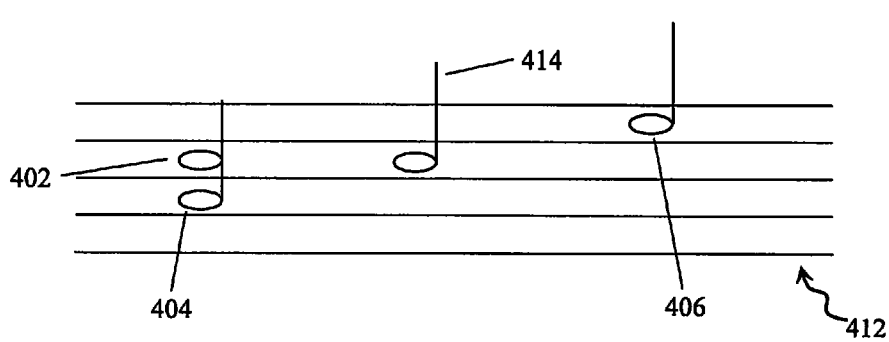

In another implementation, dynamically generated notes may be inserted into a predetermined series of notes without removing any predetermined notes. FIG. 4C is an exemplary song illustrating the predetermined series of notes included in FIG. 4A that also includes an additional dynamically generated note. Referring to FIG. 4C, notes 402, 404 and 406 are identical to the predetermined note sequence included in FIG. 4A. However, dynamically generated note 414 has been inserted in between notes 402-404 and note 406. Therefore, in order to perform the song illustrated in FIG. 4C, notes 402-404 must be performed first, note 414 must be performed next, and note 406 be performed last.

As described above, in an online skills-based musical tournament between client 104 operated by game user 120 and client device 106 operated by script 124, game server 102 will display a game interface including notes 402-406 and 414 instead of just notes 402-406. While both game user 120 and script 124 are equally capable of performing notes 402-406, only game user 120 is capable of adjusting his performance at the time of performance, in order to play dynamically generated note 414. Script 124, on the other hand, simply plays notes 402-406 as it has been pre-programmed to do.

Upon completion of the performance of all required notes indicated in FIG. 4C, a game user integrity measure, such as a numerical score, may be generated by game user integrity measure module 114. Continuing the scoring system in FIG. 4B described above, game client 104 operated by game user 120 would receive +10 points for correctly performing notes 402-406 and 414. Therefore, game user 120 would receive +40 points. Alternatively, client 106 operated by software script 124 would receive +10 points for each correctly played note 402-406, but would receive a penalty of −50 points for failing to perform additional dynamically generated note 414. Therefore, script 124's score would be −20.

Figure 5:
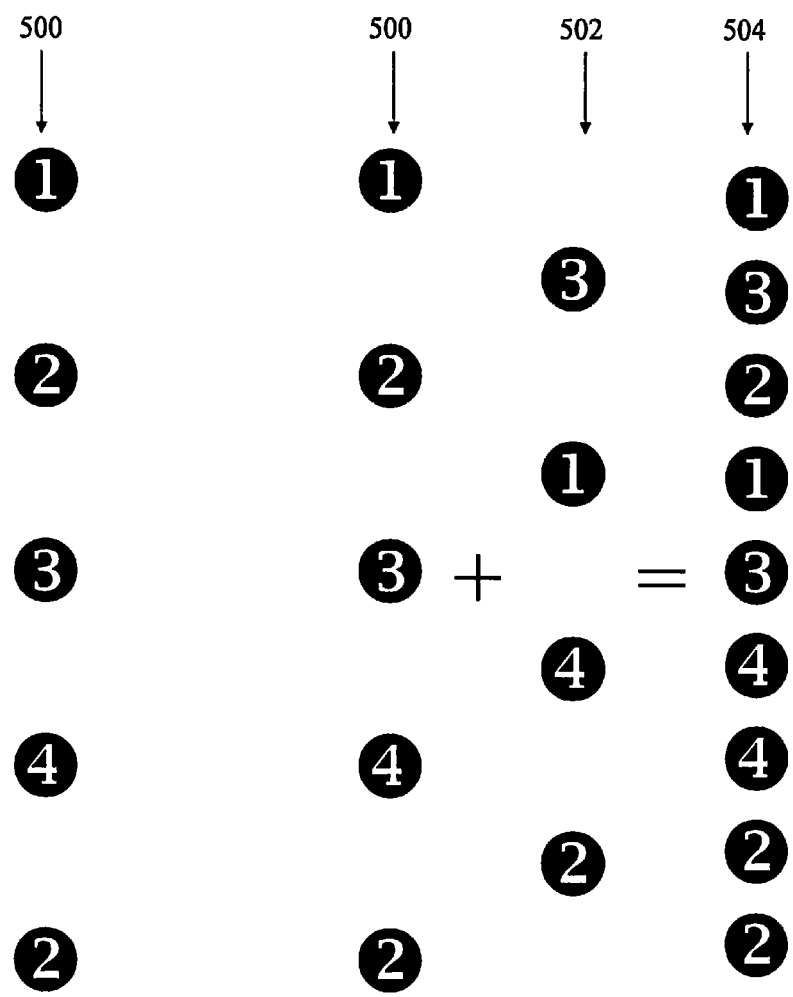
FIG. 5 is a diagram of an exemplary game input response sequence for operating an online skills-based game including a game user integrity measure module according to an embodiment of the subject matter described herein.

In yet another embodiment, a generalized game user interface including a series of screen displays indicating a button to push is provided. FIG. 5 is an exemplary generalized game user interface. Referring to FIG. 5, required input sequence 500 includes five input responses "12342". When dynamically generated input sequence 502 is interleaved with sequence 500, resulting input sequence 504 includes nine input responses "132134422". Therefore, similar to the scenarios described above, a human user would react to the additional audio or visual cues provided by the game server at the time of performance corresponding to additional input sequence 502 and generate sequence 504. Conversely, a software or mechanical cheating device, such as script 124, would be unable to react to the audio or visual cues and would therefore simply generate input responses corresponding to sequence 500.

Upon receiving the input response sequence from client and client, respectively, game server may generate a game user integrity measure, such as a numerical score, to distinguish between client operated by a human game user and client operated by script 124.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for determining an integrity measure of a game user, the method comprising:
    providing a plurality of predetermined data events in a gaming interface for sending to a client device, wherein the plurality of predetermined data events includes one or more audio/visual cues for presentation to a user as part of a game;
    inserting, during sending of the gaming interface to the client device, at least one dynamically generated data event into the predetermined data events for determining an integrity measure of a game user, wherein the at least one dynamically generated data event includes an audio/visual cue that is of a same type as the audio/visual cues of the predetermined data events, that is part of the game, and that requests a same type of response as the audio/visual cues corresponding to the predetermined data events;
    receiving an input response to the at least one dynamically generated data event, wherein the input response is capable of being successfully performed by a human user using the gaming interface and an associated input device;
    receiving input responses to the predetermined data events;
    determining a game user integrity measure comprising a score based on the received input response to the at least one dynamically generated data event and the responses to the predetermined data events; and
    indicating a presence of a non-human player based on the score.

2. The method of claim 1 wherein providing the plurality of predetermined data events in a gaming interface includes providing a plurality of audio or visual cues corresponding to musical notes in an online skills-based musical game.

3. The method of claim 2 wherein inserting, during sending of the gaming interface to the client device, at least one dynamically generated data event into the predetermined data events includes inserting at least one visual cue corresponding to a musical note.

4. The method of claim 1 wherein providing the plurality of predetermined data events in a gaming interface includes providing a plurality of audio or visual cues corresponding to obstacles in an online skills-based racing game.

5. The method of claim 4 wherein inserting, during sending of the gaming interface to the client device, at least one dynamically generated data event into the predetermined data events includes inserting at least one audio and visual cue corresponding to an obstacle.

6. The method of claim 1 wherein determining a game user integrity response measure includes:
    assigning a first point value when the input response to the at least one dynamically generated data event includes unsuccessful negotiation of each of the plurality of predetermined data events; and
    assigning a second point value when the input response to the at least one dynamically generated data event includes unsuccessful negotiation of each of the at least one dynamically generated data event, wherein the second point value is less than the first point value.

7. A system for determining an integrity measure of a game user, the system comprising:
    a game server;
    a game server module, executed by the game server, for providing a plurality of predetermined data events in a gaming interface for sending to a client device, wherein the plurality of predetermined data events includes one or more audio/visual cues for presentation to a user as part of a game; and
    a game user integrity measure module, executed by the game server, for generating and inserting at least one dynamically generated data event into the predetermined data events, for receiving an input response to the at least one dynamically generated data event and input responses to the predetermined data events, and for determining a game user integrity response measure comprising a score that is based on the received input response to the at least one dynamically generated data event and the received input responses to the predetermined data events, wherein the at least one dynamically generated data event includes an audio/visual cue that is of a same type as the audio/visual cues of the predetermined data events, that is part of the game, and that requests a same type of response as the audio/visual cues corresponding to the predetermined data events and wherein the input response is capable of being successfully performed by a human user using the gaming interface and an associated input device, and wherein the user must respond to the at least one dynamically generated data event and each of the plurality of predetermined data events correctly in order to obtain a perfect score, the game user integrity module indicating a presence of a non-human player based on the score.

8. The system of claim 7 wherein the game server module and the game user integrity measure module are located on a single hardware platform.

9. The system of claim 7 wherein the game server module and the game user integrity measure module are located on separate hardware platforms.

10. A non-transitory computer readable medium containing a computer program, executable by a processor, the computer program comprising executable instructions for:
  providing a plurality of predetermined data events in a gaming interface for sending to a client device, wherein the plurality of predetermined data events includes one or more audio/visual cues for presentation to a user as part of a game;
  inserting, during sending of the gaming interface to the client device, at least one dynamically generated data event into the predetermined data events for determining an integrity measure of a game user, wherein the at least one dynamically generated data event includes an audio/visual cue that is of a same type as the audio/visual cues of the predetermined data events, that is part of the game, and that requests a same type of response as the audio/visual cues corresponding to the predetermined data events;
  receiving an input response to the at least one dynamically generated data event, wherein the input response is capable of being successfully performed by a human user using the gaming interface and an associated input device;
  receiving input responses to the predetermined data events;
  determining a game user integrity measure comprising a score based on the received input response to the at least one dynamically generated data event and the responses to the predetermined data events; and
  indicating a presence of a non-human player based on the score.

11. The non-transitory computer readable medium of claim 10 wherein providing the plurality of predetermined data events in a gaming interface includes providing a plurality of audio or visual cues corresponding to musical notes in an online skills-based musical game.

12. The non-transitory computer readable medium of claim 11 wherein inserting, during sending of the gaming interface to the client device, at least one dynamically generated data event into the predetermined data events includes inserting at least one visual cue corresponding to a musical note.

13. The non-transitory computer readable medium of claim 10 wherein providing the plurality of predetermined data events in a gaming interface includes providing a plurality of audio or visual cues corresponding to obstacles in an online skills-based racing game.

14. The non-transitory computer readable medium of claim 13 wherein inserting, during sending of the gaming interface to the client device, at least one dynamically generated data event into the predetermined data events includes inserting at least one audio and visual cue corresponding to an obstacle.

15. The non-transitory computer readable medium of claim 10 wherein determining a game user integrity response measure includes:
  assigning a first point value when the input response to the at least one dynamically generated data event includes unsuccessful negotiation of each of the plurality of predetermined data events; and
  assigning a second point value when the input response to the at least one dynamically generated data event includes unsuccessful negotiation of each of the at least one dynamically generated data event, wherein the second point value is less than the first point value.

\* \* \* \* \*